United States Patent Office 3,575,705
Patented Apr. 20, 1971

3,575,705
METHOD FOR HARDENING A LIGHT-SENSITIVE SILVER HALIDE PHOTOGRAPHIC MATERIAL
Shui Sato, Tomio Nakajima, and Masayuki Shono, Tokyo, and Teruo Kagami, Iruma-shi, Saitama-ken, Japan, assignors to Konishiroku Photo Industry Co., Ltd.
No Drawing. Filed Oct. 22, 1968, Ser. No. 769,698
Claims priority, application Japan, Oct. 27, 1967, 42/68,776
Int. Cl. G03c 1/30; C09h 11/00
U.S. Cl. 96—111                5 Claims

ABSTRACT OF THE DISCLOSURE

A compound of the formula

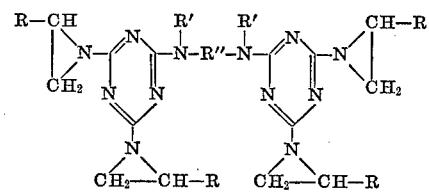

wherein R is hydrogen, methyl or ethyl; R' is hydrogen or a group capable of forming a piperazine ring together with R'' and N; and R'' is an alkylene radical having less than 10 carbon atoms or a substituted or non-substituted phenylene group is added to a light sensitive gelatinous silver halide photographic material to harden same.

This invention relates to a method for hardening a light-sensitive silver halide photographic material by using as a hardening agent a new compound of the general formula

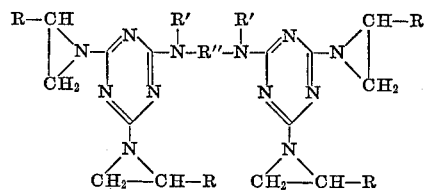

wherein R is hydrogen, methyl or ethyl; R' is hydrogen or a group capable of forming a piperazine ring together with R'' and N; and R'' is an alkylene radical having less than 10 carbon atoms or substituted or non-substituted phenylene radical.

In the prior art, certain compounds which include such inorganic compounds as chromium alum, chromium trichloride, etc. and such organic compounds as Formalin, glyoxal, acrolein, etc. are known as hardening agents. Among these, however, those which have an aldehyde group are photographically active so that they cause undesired fogging or desensitization of the emulsion concerned. Further, they have a very adverse influence on color formation in a light-sensitive color-photographic material in which a color coupler is incorporated. The chromate type hardening agent and the aldehyde type hardening agent will provide too much hardening effect just after their addition to a gelatinous photographic coating solution so that it sometimes becomes difficult to obtain smooth coating of said solution.

The compounds of the above-indicated general formula are entirely different in chemical structure from the known hardening agents and are substantially free from the above-mentioned disadvantages.

Typical compounds useful in this invention and synthetic procedures therefor will be mentioned below.

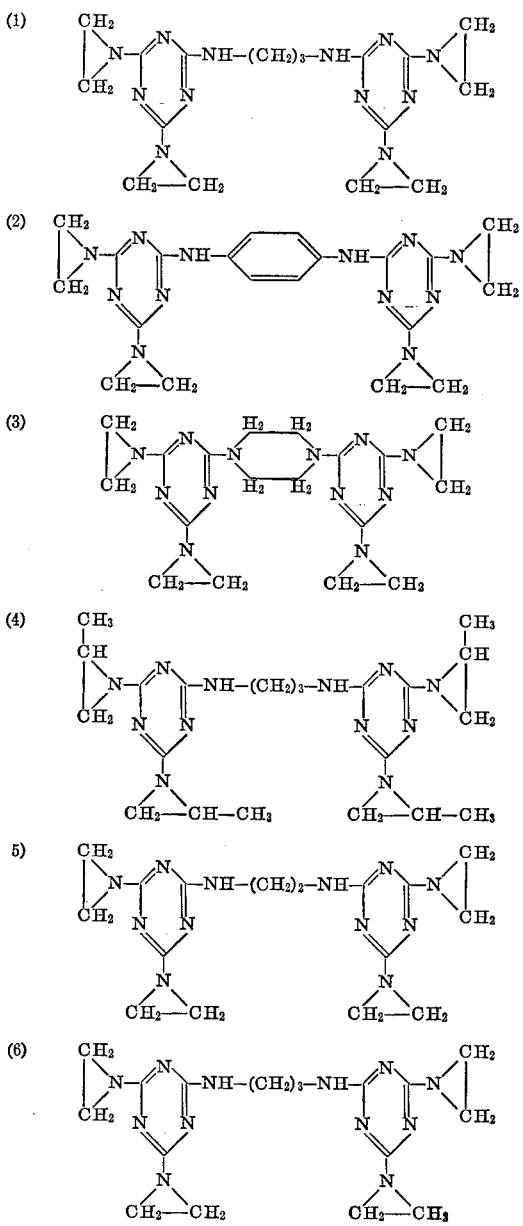

SYNTHESIS OF THE COMPOUND (1)
N,N'-bis(4,6-diethyleneimino-1,3,5-triazine-2-yl)-hexamethylenediamine A three necked flask equipped with a thermometer, dropping funnel and mechanical stirrer is charged with 173 g. of N,N'-bis(4,6-dichloro - 1,3,5 - triazine-2-yl) hexamethylenediamine, 900 cc. of dioxane and 400 cc. of water and subjected to external cooling with ice. Then, 109 g. of ethyleneimine and a solution of 174 g. of potassium carbonate in 1000 cc. of water are alternately added dropwise with stirring. During the addition, the inner temperature is controlled so that it does not exceed 5° C. by regulating the rate of the addition. After completion of addition, agitation is continued for further 2.5 hours at the same temperature and cooling is stopped and then agitation at room temperature is carried out for one hour. The reaction mixture is filtered and the filtrate is extracted with chloroform. The extract is dehydrated with anhydrous sodium sulfate, re-filtered with the addition of activated charcoal and then concentrated under reduced pressure at a temperature below 40° C. The resulting viscous semi-solid is crystallized by adding acetone. Crude yield: 89 g. Melting point: 124°–129° C. The product is dissolved in chloroform and re-precipitated with acetone to give 75 g. of white powdery crystal melting at 129°–131° C.

Elementary analysis.—Calcd. for $C_{20}H_{30}N_{12}$ (percent): C, 54.76; H, 6.90; N, 38.33. Found (percent): C, 54.32; H, 7.37; N, 38.34.

SYNTHESIS OF THE COMPOUND (3)

1,4-bis(4,6-diethyleneimino-1,3,5-triazine-2-yl)-piperazine

A mixture comprising 76 g. of 1,4-bis(4,6-dichloro-1,3,5-triazine - 2 - yl)piperazine, 300 cc. of dioxane and 300 cc. of water is cooled with ice so that it is kept at 3°–5° C. and dropped alternately with 34 g. of ethyleneimine and a solution of 114 g. of potassium carbonate in 300 cc. of water with thoroughly stirring. After the addition, the mixture is stirred for further 2 hours at the same temperature and allowed to stand overnight in a refrigerator. The reaction mixture is then filtered and the filtrate is extracted with chloroform and concentrated under reduced pressure at a temperature below 40° C. The resulting viscous liquid is crystallized by adding n-hexane. The crystals are collected by filtration and washed with acetone. The crude product is re-dissolved in a small amount of chloroform and recrystallized from n-hexane acetone to give 30 g. of purified colorless powdery crystal melting at above 300° C.

Elementary analysis.—Calcd. for $C_{18}H_{24}N_{12}$ (percent): C, 52.92; H, 5.92; N,41.16. Found (percent): C, 52.51; H, 6.00; N, 41.53.

SYNTHESIS OF THE COMPOUND (4)

N,N'-bis(4,6-propyleneimino-1,3,5-triazine-2-yl)-trimethylenediamine

The above compound can be obtained by the same procedure for the compound (1) as aforementioned by using bis(4,6-dichloro - 1,3,5 - triazine-2-yl)trimethylenediamine and 2-methyl ethyleneimine in place of bis(4,6-dichloro - 1,3,5 - triazine-2-yl)hexamethylenediamine and ethyleneimine. The product is white crystal melting at 118°–120° C.

Elementary analysis.—Calcd. for $C_{21}H_{30}N_{21}$ (percent): C, 55.99; H, 6.71; N, 37.30. Found (percent): C, 55.59; H, 7.08; N, 37.66.

In the application of the hardening agent of this invention to light-sensitive photographic materials, it may be added to sub layer, emulsion layer, inter layer, protective layer, backing layer, etc. of light-sensitive silver halide photographic materials. Alternatively, the hardening agent may be used by means of the hardening process comprising immersion after the coating of emulsion, that is to say, the hardening process by bathing before, during or after the development. The hardening agent of this invention can be used together with another hardening agent. Addition of the hardening agent to light-sensitive photographic materials is made in the form of a solution dissolved in a sole or mixed organic solvent which is usually used such as methanol, dimethyl formamide or the like. It is preferably added in an amount of 0.1–20% based on the dry weight of gelatin, contained in a coating solution. In general, the hardening agent is added after the second ripening of a silver halide emulsion has been completed. The hardening agent used in this invention may be used together with additives which are commonly applied to a silver halide emulsion such as a stabilizer, coating aid, sensitizing dye, etc. The hardening agent is applicable also to such silver halide emulsion as subjected to the gold-sensitization, sulfur-sensitization and chemical sensitization using polyalkylene oxide. Further, the hardening agent used in this invention may be mixed with a coupler.

Addition of the hardening agent brings about effective hardening without causing any undesirable effects on the photographic properties of emulsions such as fogging, sensitivity, and moreover the photographic emulsion added with the hardening agent can show appreciably improved stabilizing effect for fog and photographic speed during the storage of light-sensitive materials for a long period of time.

The present invention is further illustrated by way of the following examples but it should be understood that the present invention is not to be limited to these examples but various modifications within the extent of the claims are possible.

Example 1.—A silver bromoiodide photographic-negative emulsion containing 3 mol percent of silver iodide was prepared according to an acid emulsion process. This emulsion was added with the gold sensitizer and immediately thereafter subjected to second ripening. The thus treated emulsion was divided into four portions. One portion of the emulsion was applied onto a support to give a control sample. Each of the remaining three portions was added with the above compounds (1), (3) and (4) in the form of a methanol solution, respectively, and applied onto a support to give comparative samples. Determination of the hardness of the resulting films was made according to the following method:

With respect to films immediately after the preparation, incubated for 3 days in a thermostat at 55° C. and incubated for 3 days in a thermo-hygrostat at 50° C. and 80% of relative humidity, a temperature at which such films dissolve in pure water and a time required for such films to begin to dissolve in a 3% solution of sodium carbonate monohydrate kept at 50° C. were measured. The results obtained are shown in Table 1. In this test, photographic sensitivity which is an inverse number of the amount of light exposure to give an optical density of 0.1 above fog density is expressed as relative speed to that of unstored control film.

TABLE 1

| | | Photosensitiveness of emulsion (just after the preparation of the film) | | Hardness | | | | |
|---|---|---|---|---|---|---|---|---|
| | | | | Dissolving temperature in pure water (° C.) | | | Time required to begin to dissolve in alkali solution (second) | |
| | Amount per 100 g. of gelatin (g.) | Fog | Relative speed | Immediately after the preparation | Incubated at 55° C. for 3 days after the preparation | Incubated at 50° C. and 80% R.H. for 3 days after the preparation | Immediately after the preparation | Incubated at 55° C. for 3 days after the preparation | Incubated at 55° C. and 80% R.H for 3 days after the preparation |
| Control | | 0.23 | 100 | 28.2 | 29.1 | 30.2 | 3.1 | 3.3 | 3.3 |
| Compound 1 | 0.45 | 0.15 | 92 | >70 | >70 | >70 | 120 | 122 | 95 |
| Compound 3 | 2.40 | 0.19 | 91 | 66.0 | >70 | >70 | 25 | 25 | 23 |
| Compound 4 | 1.80 | 0.18 | 96 | 65.0 | 65.0 | >70 | 15 | 18 | 23 |

Example 2.—A similar photographic emulsion as used in the Example 1 was subjected to the second ripening and then divided into five portions. One of the portions was used as a control and each of the remaining four portions was added with the compound (1) in an amount indicated below to give comparative samples. With respect to films obtained by using the emulsions thus prepared, photographic properties and hardness were determined by the same method as in the Example 1. The results obtained are shown in Table 2.

TABLE 2

| | Amount per 100 g. of gelatin (g.) | Photosensitiveness of emulsion (just after the preparation of the film) | | Hardness | | | | | |
|---|---|---|---|---|---|---|---|---|---|
| | | | | Dissolving temperature in pure water (° C.) | | | Time required to begin to dissolve in alkali solution (second) | | |
| | | Fog | Relative speed | Immediately after the preparation | Incubated at 55° C. for 3 days after the preparation | Incubated at 50°C. and 80% R.H. for 3 days after the preparation | Immediately after the preparation | Incubated at 55° C. for 3 days after the preparation | Incubated at 55° C. and 80% R.H. for 3 days after the preparation |
| Control | | 0.25 | 100 | 28.1 | 29.1 | 30.1 | 3 | 3.5 | 3.5 |
| Compound 1 | 0.2 | 0.21 | 98 | 30.3 | 34.1 | 35.3 | 3.5 | 3.4 | 3.5 |
| Do | 0.3 | 0.21 | 96 | 39.0 | 40.2 | 41.9 | 7.8 | 10.4 | 4.5 |
| Do | 0.4 | 0.19 | 96 | >70 | >70 | >70 | 100 | 102 | 85 |
| Do | 0.6 | 0.14 | 89 | >70 | >70 | >70 | 140 | 133 | 105 |

Application of the emulsion added with the compounds used in this invention was satisfactory and, as apparent from the Tables 1 and 2, excellent hardening effect was obtained without causing any fogging or desensitization of the emulsion.

Example 3.—A similar photographic emulsion as used in the Example 1 was subjected to the second ripening and then added with the color coupler. 1-(4'-phenoxy-3'-sulfophenyl)-3-heptadecyl-5-pyrazolone. The resulting emulsion was divided into four portions. One of the portions was used as a control sample and each of the remaining portions was added with the compound (1) or (3) in the form of a methanol solution and applied onto a support to give comparative samples.

Determination of the hardness of the resulting films was made in the same manner as Example 1 and photographic properties were measured on the films which had been subjected to the treatment with a color developer comprising diethyl-p-phenylenediamine and bleaching, fixing and washing treatments according to a usual manner. Results obtained are shown in Table 3.

TABLE 3

| | Amount per 100 g. of gelatin (g.) | Photosensitiveness of emulsion (just after the preparation of the film) | | Hardness | | | | | |
|---|---|---|---|---|---|---|---|---|---|
| | | | | Dissolving temperature in pure water (° C.) | | | Time required to begin to dissolve in alkali solution (second) | | |
| | | Fog | Relative speed | Immediately after the preparation | Incubated at 50° C. for 3 days after the preparation | Incubated at 50° C and 80% R.H. for 3 days after the preparation | Immediately after the preparation | Incubated at 55° C. for 3 days after the preparation | Incubated at 50° C. and 80% R.H. for 3 days after the preparation |
| Control | | 0.20 | 100 | 29.1 | 30.0 | 30.1 | 3.5 | 3.7 | 3.8 |
| Compound 1 | 0.5 | 0.13 | 98 | >70 | >70 | >70 | 122 | 130 | 99 |
| Compound 3 | 1.0 | 0.18 | 98 | 33.3 | 36.9 | 36.2 | 16 | 16 | 10 |
| Do | 2.0 | 0.16 | 94 | 63 | >70 | >70 | 22 | 21 | 18 |

As noted from the Table 3, the photographic emulsions added with the compounds used in this invention are free from fogging and cause no undesirable effect on color photographic coupler.

What we claim is:

1. A method for hardening light-sensitive gelatinous silver halide photographic materials, characterized by adding as a hardening agent a compound of the general formula

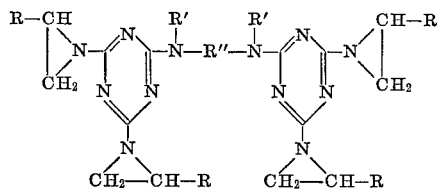

wherein R is hydrogen, methyl or ethyl; R' is hydrogen or a group capable of forming a piperazine ring together with R" and N; and R" is an alkylene radical having less than 10 carbon atoms or a substituted or non-substituted phenylene group.

2. A method for hardening a light-sensitive gelatinous silver halide photographic material as claimed in claim 1, wherein said compound is incorporated in any one of the gelatinous layers of said photographic material.

3. A method for hardening a light-sensitive gelatinous silver halide photographic material as claimed in claim 1, wherein said photographic material is a light-sensitive gelatinous silver halide color-photographic material having a coupler incorporated therein.

4. A method for hardening a light-sensitive gelatinous silver halide photographic material as claimed in claim 1, wherein said compound is added in the amount of 0.1–20% on the dry weight basis of the gelatine contained in said photographic material.

5. The method for hardening gelatin, characterized by adding to the gelatin a compound of the general formula

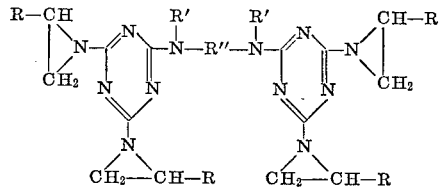

wherein R is hydrogen, methyl or ethyl; R' is hydrogen or a group capable of forming a piperazine ring together with R" and N; and R" is an alkylene radical having less than 10 carbon atoms or substituted or non-substituted phenylene radical.

References Cited

UNITED STATES PATENTS

| 2,983,611 | 5/1961 | Allen et al. | 96—111 |
| 3,017,280 | 11/1962 | Yudelson | 260—117 |
| 2,950,197 | 8/1960 | Allen et al. | 96—111 |
| 2,171,427 | 8/1939 | Eggert et al. | 260—117 |
| 2,712,004 | 6/1955 | Thomas | 260—249.6 |
| 2,964,404 | 12/1960 | Burness | 260—117 |
| 3,317,529 | 5/1967 | Beachem et al. | 260—249.6 |
| 3,220,848 | 11/1965 | Himmelmann et al. | 96—111 |

WILLIAM D. MARTIN, Primary Examiner

M. SOFOCLEOUS, Assistant Examiner

U.S. Cl. X.R.

96—114.7; 106—125; 260—117, 249.6